Feb. 24, 1959 A. J. HERSTER 2,874,846
FILTER
Filed June 22, 1955

INVENTOR.
ANTUN J. HERSTER
BY
W. B. Harpman
ATTORNEY

United States Patent Office 2,874,846
Patented Feb. 24, 1959

2,874,846

FILTER

Antun J. Herster, Sharon, Pa.

Application June 22, 1955, Serial No. 517,239

4 Claims. (Cl. 210—232)

This invention relates to a filter and more particularly to a filter for use in a domestic water system to remove rust and other impurities from the water supply.

The principal object of the invention is the provision of a filter having means for loosely positioning a plurality of filter elements in operative relation to a water supply directed therethrough.

A further object of the invention is the provision of a simple and inexpensive filter for a domestic water supply incorporating readily replaceable filter elements.

A still further object of the invention is the provision of a filter incorporating a plurality of loosely assembled superimposed filter elements and means for maintaining the same in loosely assembled relation during a filtering operation.

A still further object of the invention is the provision of a filter incorporating a removable filter element supporting grid having means detachably secured thereto for positioning a plurality of filter elements in loosely assembled superimposed relation thereon.

The filter disclosed herein is particularly adapted for use in domestic water systems such as found in homes and business establishments beyond the water mains and wherein the water supply generally comprises a well, a pump and a storage tank. Such systems are widely used and very frequently produce objectionable quantities of rust, scale and lime deposits which can be filtered therefrom.

The present invention relates to a simple filter for use with such water systems and provides efficient filtering action through expendable cloth filtering discs similar to those employed in the diary industry for filtering milk. The discs are positioned in the filter on a supporting grid in loosely arranged superimposed relation and retained in such position in the filter thereby forming an assembly that may be readily removed and replaced to keep the filter in free-flowing efficient operation.

With the foregoing and other objects in view which will appear as the description proceeds, the invention resides in the combination and arrangement of parts and in the details of construction hereinafter described and claimed, it being the intention to cover all changes and modifications of the example of the invention herein chosen for purposes of the disclosure, which do not constitute departures from the function and scope of the invention.

The invention is illustrated in the accompanying drawing, wherein.

Figure 1:
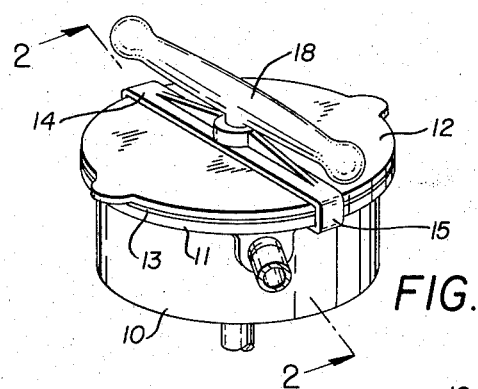
Figure 1 is a perspective view of the filter.

By referring to the drawings and Figure 1 in particular it will be seen that a filter has been disclosed which comprises a housing 10 having an annular outturned flange 11 about its upper open end with a cap 12 disposed on the upper open end of the housing 10 along with a gasket 13. A clamp comprising a transversely positioned arm 14, the ends 15—15 of which are U-shaped, is positioned over the cap 12 with the ends 15—15 of the arm 14 engaged beneath the flange 11 on the housing 10. A centrally located threaded opening 16 formed in the arm 14 receives a threaded depending portion 17 of a transversely positioned handle 18, as best shown in Figure 2 of the drawings.

Figure 2:
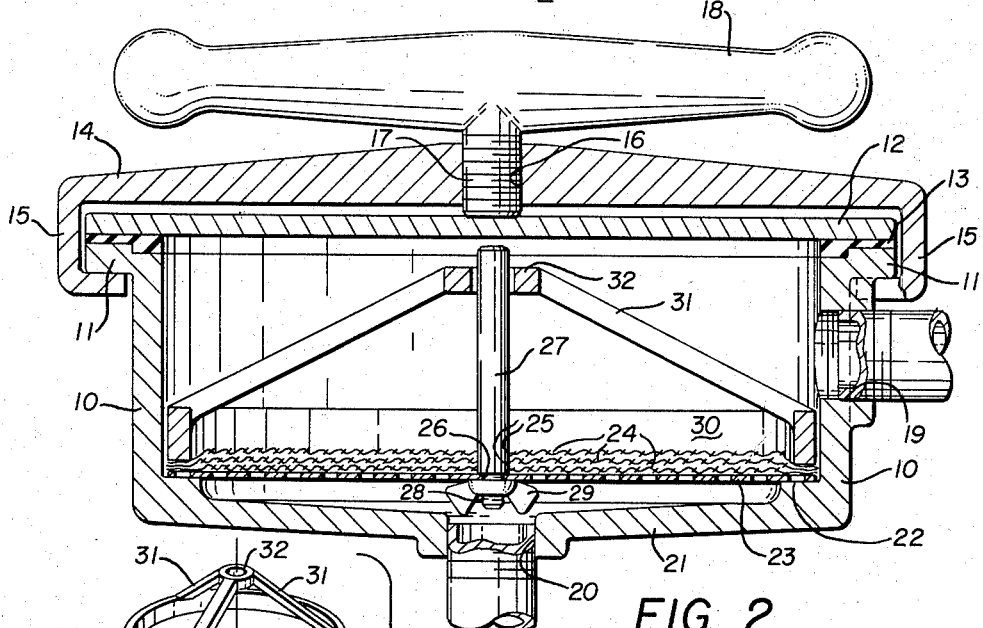
Figure 2 is a cross sectional view taken on line 2—2 of Figure 1.
Figure 3:
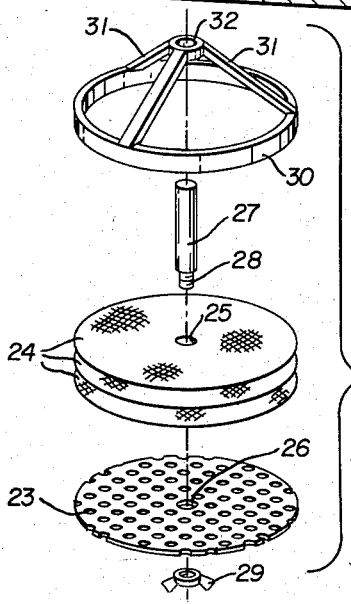
Figure 3 is an exploded view of the filter assembly used in the filter shown in Figs. 1 and 2.

By referring to Figure 2 of the drawings it will be seen that the threaded depending portion 17 of the handle 18 engages the lid 12 when the handle 18 is revolved in one direction and forces the lid 12 downwardly against the gasket 13 on the flange 11 of the housing 10. As the ends 15—15 of the arm 14 are engaged beneath the flange 11, the lid is tightly secured to the housing 10.

The housing 10 is provided with an inlet opening 19 and an outlet opening 20, the inlet opening 19 being in the side wall of the housing 10 substantially above the bottom of the housing 10 which is indicated by the numeral 21. The outlet opening 20 is centrally located in the bottom 21.

An annular shoulder 22 is formed in the housing 10 above the bottom 21 and is adapted to support a grid 23 which is thereby positioned above the bottom 21 of the housing 10 and above the outlet opening 20.

A plurality of cloth filter discs 24—24 are disposed on the grid 23, the filter discs 24—24 being of the same diameter as the grid 23 and are provided with centrally disposed apertures 25 which register with a centrally disposed aperture 26 in the grid 23.

A stem 27, having a depending threaded extension 28 of lesser diameter than the stem 27, is positioned on the grid 23 with the depending threaded extension 28 extending therethrough and engaged with a butterfly nut 29. The stem thus stands vertically through the centers of the cloth filter discs 24—24.

In order that the cloth filter discs 24—24 may be retained in position on the grid 23 in loosely arranged superimposed position, a ring 30 having inwardly and upwardly extending arms 31 is positioned on the cloth filter discs 24—24 adjacent their peripheral edges. The arms 31 of the ring 30 are joined at their apexes by an apertured member 32 which is loosely engaged over the upper portion of the stem 27.

It will thus be seen that the cloth filter discs 24—24 are retained in position on the grid 23 but in such a manner that they remain in loosely stacked relation to one another whereby the fine projecting nap of the cloth filter discs 24—24 remain usable as filtering agents.

Water introduced into the filter through the inlet opening 19 and discharged from the filter through the outlet opening 20 will thus pass downwardly through the filter discs 24—24 and be effectively filtered through the loosely arranged multiple layers thereof.

At such time as the cloth filter discs 24—24 should be replaced, the clamp holding the lid 12 on the housing is loosened, the lid 12 removed and the ring 30 lifted, either separately or with the grid 23, the cloth filter discs 24—24 replaced and the filter re-assembled, all of which can be done very quickly and very easily.

It will thus be seen that the filter disclosed herein is so formed that the cloth filter discs employed are used in their maximum efficiency due to the loosely arranged superimposed position thereof and the structure providing for such loose arrangement while at the same time securing them against accidental displacement and retaining them in covering relation to the grid 23 through which liquid introduced into the filter must pass.

It will be seen that the filter disclosed herein meets the several objects of the invention.

Having thus described my invention, what I claim is:

1. A water filter comprising a housing with an open top and a removable closure therefor, and an inlet opening in a side wall of said housing and an outlet opening in a bottom wall of said housing, a shoulder in said housing above said bottom wall, a grid disposed horizontally in said housing on said shoulder, a vertical upstanding stem centrally disposed on said grid, a plurality of cloth filter discs having centrally disposed apertures positioned on said grid around said stem, a ring having upwardly and inwardly extending arms thereon joined at their apexes to an apertured member, said ring positioned on said cloth filter discs adjacent their peripheral edge with said stem projecting through said apertured member said apertured member being in spaced relation to said cloth filter discs and said closure.

2. A filter as set forth in claim 1 and wherein the stem is removably affixed to said grid.

3. In a filter as set forth in claim 1 and wherein the stem is removably affixed to said grid and the ring is of a diameter substantially the same as said grid.

4. A water filter comprising a plurality of cloth fabric filter discs, means for supporting said cloth fabric filter discs comprising an apertured plate disposed horizontally therebeneath, an upright stem standing vertically and centrally of said apertured plate, a ring having a plurality of arms extending upwardly and centrally thereof and joined at their apexes at a point above said ring, an opening through the apexes of said arms, said ring disposed on said cloth fabric filter discs and said stem loosely engaged in the opening of said apexes of said arms and projecting thereabove.

References Cited in the file of this patent

UNITED STATES PATENTS

| | | |
|---|---|---|
| 793,475 | Ulander | June 27, 1905 |
| 1,026,500 | Elledge | May 14, 1912 |
| 1,524,547 | Giacobbe | Jan. 27, 1925 |
| 2,327,803 | Kidd | Aug. 24, 1943 |
| 2,603,356 | Hisely | July 15, 1952 |

FOREIGN PATENTS

| | | |
|---|---|---|
| 18,780 | France | Apr. 6, 1914 |
| 488,421 | France | June 27, 1918 |
| 330,292 | Italy | Oct. 9, 1935 |